(12) United States Patent
Bruyere et al.

(10) Patent No.: US 12,337,774 B2
(45) Date of Patent: Jun. 24, 2025

(54) DUAL VOLTAGE ELECTRICAL ARCHITECTURE FOR A VEHICLE, IN WHICH THE ONLY POWER SOURCE IS A LITHIUM-ION BATTERY

(71) Applicant: Volvo Construction Equipment AB, Eskilstuna (SE)

(72) Inventors: Lilian Bruyere, Belley (FR); Ahcene Nedjimi, Lyons (FR); Xavier Morel, Saint-Didier-de-la-Tour (FR)

(73) Assignee: Volvo Construction Equipment AB, Eskilstuna (SE)

( * ) Notice: Subject to any disclaimer, the term of this patent is extended or adjusted under 35 U.S.C. 154(b) by 60 days.

(21) Appl. No.: 18/380,132

(22) Filed: Oct. 13, 2023

(65) Prior Publication Data

US 2024/0174189 A1    May 30, 2024

(30) Foreign Application Priority Data

Nov. 29, 2022  (WO) ................. PCT/EP2022/083608
Sep. 29, 2023  (EP) .................................... 23200744

(51) Int. Cl.
*B60L 50/60*     (2019.01)
*B60R 16/033*    (2006.01)
(Continued)

(52) U.S. Cl.
CPC ............ *B60R 16/033* (2013.01); *B60L 50/60* (2019.02); *H01M 10/0525* (2013.01);
(Continued)

(58) Field of Classification Search
None
See application file for complete search history.

(56) References Cited

U.S. PATENT DOCUMENTS 9,365,114 B2   6/2016  Kim et al.
11,104,232 B2  8/2021  Mittnacht et al.
(Continued)

FOREIGN PATENT DOCUMENTS

CN   104908603 A   9/2015
CN   108340856 A   7/2018
EP     2426005 A2   3/2012

OTHER PUBLICATIONS

International Search Report and Written Opinion for PCT Patent Application No. PCT/EP2022/083608, mailed Jun. 23, 2023, 14 pages.
(Continued)

*Primary Examiner* — Jared Fureman
*Assistant Examiner* — Joel Barnett
(74) *Attorney, Agent, or Firm* — Sage Patent Group

(57) ABSTRACT

A dual voltage electrical architecture for a vehicle, including a low-voltage network, a high-voltage network and a DC/DC converter for transferring power from the high-voltage network to the low-voltage network, the electrical architecture further including a lithium-ion battery, a first and second contactors connected respectively to a positive and a negative terminals of the lithium-ion battery, a pre-charge circuit consisting of a pre-charge contactor and a pre-charge resistor connected in series, wherein the pre-charge contactor and the pre-charge resistor are connected in parallel with the first contactor, a battery management unit for controlling the opening and closing of the contactors and a vehicle start device. The DC/DC converter includes a first input terminal connected to the first contactor and to the pre-charge contactor and a second input terminal connected to the second contactor. The only power source of the architecture is the lithium-ion battery delivering power to the high-voltage network.

13 Claims, 4 Drawing Sheets

(51) Int. Cl.
  *H01M 10/0525*  (2010.01)
  *H01M 10/42*  (2006.01)
  *H01M 10/46*  (2006.01)
  *H02J 1/08*  (2006.01)

(52) U.S. Cl.
  CPC ..... *H01M 10/425* (2013.01); *H01M 10/4264* (2013.01); *H01M 10/46* (2013.01); *H02J 1/082* (2020.01); *B60L 2200/40* (2013.01); *B60L 2210/10* (2013.01); *H01M 2010/4271* (2013.01); *H01M 2220/20* (2013.01)

(56) References Cited

U.S. PATENT DOCUMENTS

| | | | |
|---|---|---|---|
| 2016/0311326 A1* | 10/2016 | Steele | B60L 50/60 |
| 2019/0140245 A1* | 5/2019 | Mensch | H02H 3/08 |
| 2022/0274488 A1 | 9/2022 | Spjuth et al. | |
| 2022/0311269 A1* | 9/2022 | Ishihara | H02J 7/0063 |
| 2023/0103895 A1* | 4/2023 | Fujioka | H01M 10/615 701/29.2 |

OTHER PUBLICATIONS

European Search Report, EP Patent Application No. 23200744, mailed Mar. 1, 2024, 2 pages.

* cited by examiner

DUAL VOLTAGE ELECTRICAL ARCHITECTURE FOR A VEHICLE, IN WHICH THE ONLY POWER SOURCE IS A LITHIUM-ION BATTERY

CROSS REFERENCE TO RELATED APPLICATIONS

This bypass continuation application claims foreign priority to European Patent Application No. 23200744.3, filed on Sep. 29, 2023, and to International Patent Application No. PCT/EP2022/083608, filed Nov. 29, 2022, the disclosures and content of which are incorporated by reference herein in their entirety.

TECHNICAL FIELD

The disclosure relates generally to a dual voltage electrical architecture for a vehicle which, as its name indicates, comprises a low-voltage network and a high-voltage network. In particular aspects, the disclosure relates to a dual voltage electrical architecture specific in that the only power source is a high-voltage lithium-ion battery, thereby an architecture devoid of any low-voltage battery. The disclosure can be applied to light vehicles such as passenger cars, but also to medium and heavy-duty vehicles, such as trucks, boats, military/armored vehicles, buses, and construction equipment, among other vehicle types. Although the disclosure may be described with respect to a particular vehicle, the disclosure is not restricted to any particular vehicle.

BACKGROUND

In the automotive industry, Electric Vehicles (EVs), including Battery Electric vehicles (BEVs) and Hybrid Electric Vehicles (HEVs), are known to include at least one rechargeable battery pack storing electric power for driving the electric motor(s) of the vehicle. The trend towards electrification of vehicles is also affecting construction equipment. This has even become an imperative in some calls for tenders, particularly in the Nordic countries in Europe, which are very committed to ecology. Also, electrical construction equipment are highly appreciated for their low noise level, which makes them particularly suitable for city centers, hospitals or the like and small construction sites, such as home gardens (landscape work).

However, the autonomy of electric vehicles or construction machineries on the market remains low. In addition, a lot of new components have been integrated into the vehicles so as to offer performances as close as possible to that of Diesel machines or thermal vehicles, such as on-board charger, cooling system, etc. As a result, the final price of the electric vehicles remains quite high in comparison with thermal vehicles. In fact, gasoline has about 100 times the energy density of a lithium-ion battery. Accordingly, the lithium-ion battery pack is as large as possible in order to offer maximum autonomy.

However, this is problematic especially for compact cars or construction machineries that have very limited available space. A further challenge concerns the traditional lead acid battery. In conventional cars or construction machinery, the lead-acid battery is used to crank the diesel/gasoline engine and supply the auxiliaries (radio, AC, lamps, etc.) when the engine is off. Once the engine is running, the alternator is used to supply the 12V or 24V network and to recharge the 12V or 24V lead acid battery. On small vehicles, e.g. passenger cars, the lead-acid battery is a 12V battery. On heavy-duty vehicles, such as trucks, the Lead-acid battery is a 24V battery that may be composed of two serially connected 12V batteries.

For electric cars or machines, the 12V or 24V battery is also used to wake up the electronic machine controller as well as the Lithium-ion Battery Management System (BMS). Plus, certain electrical equipment/devices on-board are still powered in 12V or 24V. As a result, any Battery Electric Vehicle (BEV) on the market systematically includes a 'low-voltage' network (e.g. 12V or 24V) including a Lead-Acid Battery and a 'high-voltage' network (e.g. 48V) including a Lithium-ion battery. This is called a 'Dual voltage' electrical architecture or system.

Once the lithium-ion battery is awake, a DC/DC converter is used to convert the voltage from the main lithium battery source to the 12V or 24V low voltage network, in order to recharge the low-voltage battery. This leads to the following problems:

The first problem is the lack of space to integrate the 12V or 24V lead acid battery in an electric machine. Sometimes, a (compact) motorbike battery is even used as a solution to overcome the limited space. However, even if a motorbike battery is smaller than a car lead acid battery, the drawback is the very small capacity: it cannot sustain the low voltage power in long term and under all conditions (e.g. winter). Indeed, a lead acid battery left in storage at moderate temperature has an estimated self-discharge rate of 5% per month. This rate increases as temperatures rise or drop and as the risk of sulfation goes up. This can lead to situation where it is not possible to start-up the electric machine.

One possibility to overcome this problem is to embed a large 12V lead acid battery with much higher capacity but as consequence the machine autonomy will be limited (as the lithium-ion battery pack will be reduced in size). The other possibility is to replace the lead acid battery once it fails. But this generally takes time and money.

SUMMARY

A first aspect of the disclosure concerns a dual voltage electrical architecture for a vehicle, said architecture comprising a low-voltage network, a high-voltage network and a DC/DC converter for transferring power from the high-voltage network to the low-voltage network, the electrical architecture further comprising a high-voltage lithium-ion battery, a first and second contactors connected respectively to a positive and a negative terminals of the lithium-ion battery, a pre-charge circuit consisting of a pre-charge contactor and a pre-charge resistor connected in series, wherein the pre-charge contactor and the pre-charge resistor are connected in parallel with the first contactor, a Battery Management Unit (BMU) for controlling the opening and closing of the contactors and a vehicle start device. The DC/DC converter comprises a first input terminal connected to the first contactor and to the pre-charge contactor and a second input terminal connected to the second contactor. The only power source of the electrical architecture is the lithium-ion battery delivering power to the high-voltage network. The battery management unit comprises an input terminal connected to the vehicle start device so that when the vehicle start device is operated, the electrical architecture enters into a battery wake-up mode, in which
  the first contactor is open;
  the second contactor and the pre-charge contactor are closed; and
  the DC/DC converter generates power at low-voltage in order to wake up a main vehicle electronic board.

The first aspect of the disclosure may seek to remove the Lead-Acid 12V or 24V battery that can be traditionally found on BEVs. A technical benefit may include a gain of space that allows installing a larger Lithium-ion battery with a higher capacity. Another technical benefit is that starting procedure is more reliable because Li-ion batteries are less sensitive to temperature conditions than Lead-Acid batteries, thereby ensuring a smooth start regardless of outside temperature (e.g. winter).

Optionally in some examples, including in at least one example, the vehicle start device controls a switch that connects the input terminal of the battery management unit to the ground (GND) or to a positive electric potential (Vcc).

Optionally in some examples, including in at least one example, the battery management unit includes a pull-down resistor between the input terminal and the ground and/or a pull-up resistor between the input terminal and the positive electric potential.

Optionally in some examples, including in at least one example, the positive electric potential is generated by the lithium-ion battery, thereby supplying the battery management unit in permanence.

Optionally in some examples, including in at least one example, once the main vehicle electronic board is awake, the first contactor is closed and then, the pre-charge contactor is opened.

Optionally in some examples, including in at least one example, the battery management unit includes processing circuitry to detect a change of voltage at the input terminal, thereby representing the operation of the vehicle start device.

Optionally in some examples, including in at least one example, the DC/DC converter is a step-down converter that automatically steps down voltage whenever a voltage is applied between the two input terminals of the DC/DC converter.

Optionally in some examples, including in at least one example, the DC/DC converter includes at least two semiconductors, such as a diode and a transistor and at least one energy storage element, such as a capacitor, an inductor or the two in combination.

Optionally in some examples, including in at least one example, the low-voltage network is a 12V or 24V network and the high-voltage network is a 48V network.

A second aspect of the disclosure concerns a vehicle comprising a dual voltage electrical architecture according to any previous Examples.

Optionally in some examples, including in at least one example, the vehicle is a construction equipment.

Optionally in some examples, including in at least one example, the vehicle is a Battery Electric Vehicle or a Hybrid Electric Vehicle.

A third aspect of the disclosure concerns a method for starting a vehicle according to previous Example, the method comprising steps consisting of:
a) operating the vehicle start device;
b) closing the second contactor and the pre-charge contactor, in order to have the DC/DC converter generating power at low-voltage and waking up the main vehicle electronic board;
c) once the main vehicle electronic board is awake, closing the first contactor and then, opening the pre-charge contactor.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
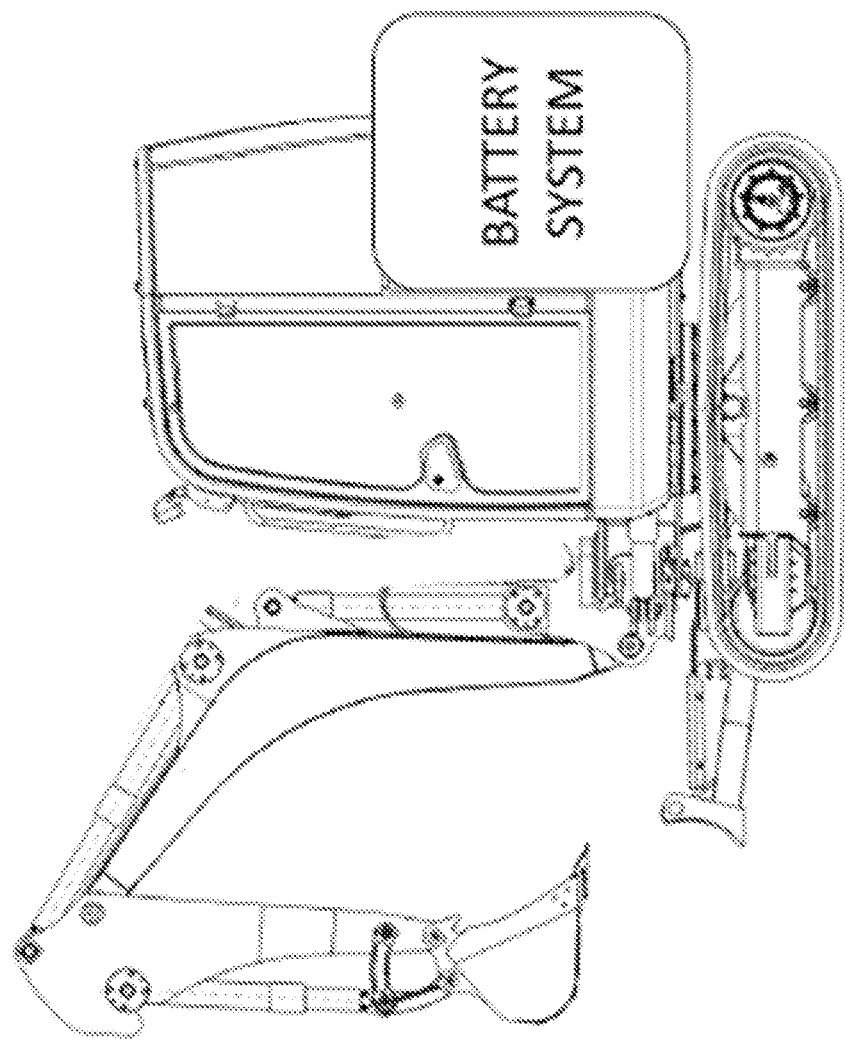
FIG. 1 is an exemplary side view of a vehicle, in particular a construction equipment/excavator, according to an example.

FIG. 1 is an exemplary side view of a vehicle according to an example. In this example, the vehicle is a construction equipment/machine, in particular a compact excavator. However, the disclosure obviously applies to any other type of vehicles, such as trucks, passenger cars, boats, utility vehicles, military or armored vehicles, etc.

Specifically, the vehicle is a Battery Electric Vehicle (BEV) or Hybrid Electric Vehicle (HEV) comprising a Lithium-ion battery for supplying drive component(s), e.g. electro-pump and/or electric motor(s).

The vehicle comprises a dual voltage electrical architecture which (as its name indicates) includes a low-voltage network (e.g. 12 or 24V) and a high-voltage network (e.g. 48V). A DC/DC converter is provided for transferring power from the high-voltage network to the low-voltage network, so that the only power source of the electrical architecture is a lithium-ion battery pack delivering power to the high-voltage network. As a result, no low-voltage battery is provided, which increases the available space on the vehicle.

In the example, the low-voltage network includes a Vehicle Electronic Control Unit (VECU), auxiliary loads AUX and a Human-Machine Interface (HMI). For instance, and in the example of a HEV, auxiliary loads of the low-voltage network include the starter (for starting the Internal Combustion Engine (ICE)). Also, the high-voltage network includes drive components, e.g. electric motor(s) and/or electro-pump, and auxiliary loads AUX that require high power, such as steering assistance, air compressor, High-Pressure (HP) hydraulic pump, etc. The VECU can also be known as the main vehicle electronic board or controller.

Drive components, e.g. electric motors, can draw energy from the lithium-ion battery but can also recharge the lithium-ion battery through regenerative braking. To do that, an inverter may be used to convert AC current delivered by the electric machine(s) into DC current.

In the example of a compact excavator, the electric motor can be used to drive a High-Pressure (HP) pump in order to actuate hydraulic cylinders provided on the excavator arm and/or hydraulic motors to drive ground connection means, e.g. wheels or caterpillars.

The lithium-ion battery is a battery pack composed of a plurality of battery cells assembled in series and possibly in parallel. For instance, the battery pack can be composed of 2V battery cells which, once assembled, form a battery pack capable of delivering 48V.

The electrical architecture further comprises a first and second contactors or relays connected respectively to a positive terminal and a negative terminal of the lithium-ion battery.

The electrical architecture further comprises a pre-charge circuit having a pre-charge contactor or relay and a pre-charge resistor that are connected in parallel with the first contactor.

The electrical architecture further comprises a Battery Management Unit or System (BMU or BMS) for controlling the opening and closing of the contactors and a vehicle start device, comprising a manual switch or a button. In an embodiment, the vehicle start device includes a keyhole inside which an operator engages and rotates a key to start the vehicle. It can also be a push button. The vehicle start device is a manual operating element.

The DC/DC converter comprising a first input terminal connected to the first contactor and to the pre-charge contactor (or pre-charge circuit) and a second input terminal connected to the second contactor. In other words, the first input terminal is connected to a node between the first contactor and the pre-charge contactor.

The battery management unit comprises an input terminal connected to the vehicle start device so that when the vehicle start device is operated, the electrical architecture enters into a battery wake-up mode, in which the first contactor is open and in which the second contactor and the pre-charge contactor are closed. As a result, and thanks to the pre-charge resistor, a limited output current is provided to the DC/DC converter which, in turn, generates power at low-voltage in order to wake up the Vehicle Electronic Control Unit (VECU).

The DC/DC converter is specific in that is automatically switched ON as soon as a voltage is applied at its two input terminals. In the example, the input voltage applied at the input terminals of the DC/DC converter corresponds to the voltage between the two terminals of the lithium-ion battery, e.g. 48V. The DC/DC converter may be a buck converter or step-down converter which steps down voltage (while stepping up current) from the input (supply) to the output (loads).

Figure 4:
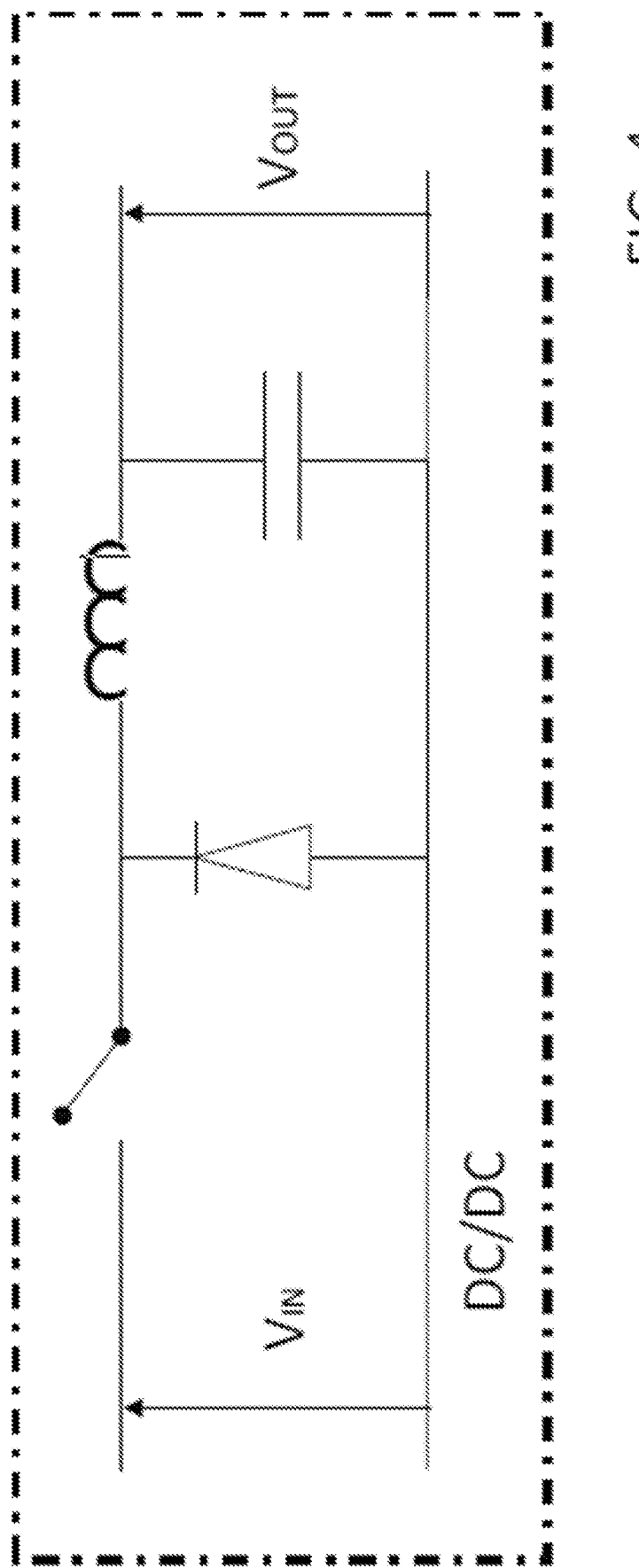
FIG. 4 is a scheme representing a DC/DC converter of the electrical architecture.

FIG. 4 represents a detailed example of the step-down converter. According to this specific example, the converter includes at least two semiconductors (a diode and a transistor) and at least one energy storage element, e.g. a capacitor, inductor, or the two in combination. In known manner, the transistor acts as a switching element. A transistor includes an emitter, a collector and a base. When no voltage is applied at the input terminals of the DC/DC, the transistor acts as an open switch. When some voltage, e.g. 48V, is applied between the two input terminals of the DC/DC, electrons are moving from the emitter to the base and then from the base to the collector. As a result, the transistor automatically switches to its "on" state, without the need of external power.

In an embodiment, the vehicle start device controls a switch that connects the input terminal of the battery management unit to the ground (GND) or to a positive electric potential (Vcc).

Advantageously, the battery management unit includes a pull-down resistor 20 between the input terminal and the ground and/or a pull-up resistor 10 between the input terminal and the positive electric potential Vcc.

The positive electric potential to which it is referred to may be generated by the lithium-ion battery, thereby supplying the battery management unit (BMU) with power in permanence. For instance, the battery management unit can be connected in parallel to a battery cell of the lithium-ion battery pack so that only a single battery cell of the pack delivers Direct Current (DC) in permanence, which minimizes battery overall discharge. To do that, the BMU is embedded/integrated into the lithium-ion battery.

Advantageously, the battery management unit includes processing circuitry to detect a change of voltage at the input terminal, such change representing the operation of the vehicle start device.

Figure 2:
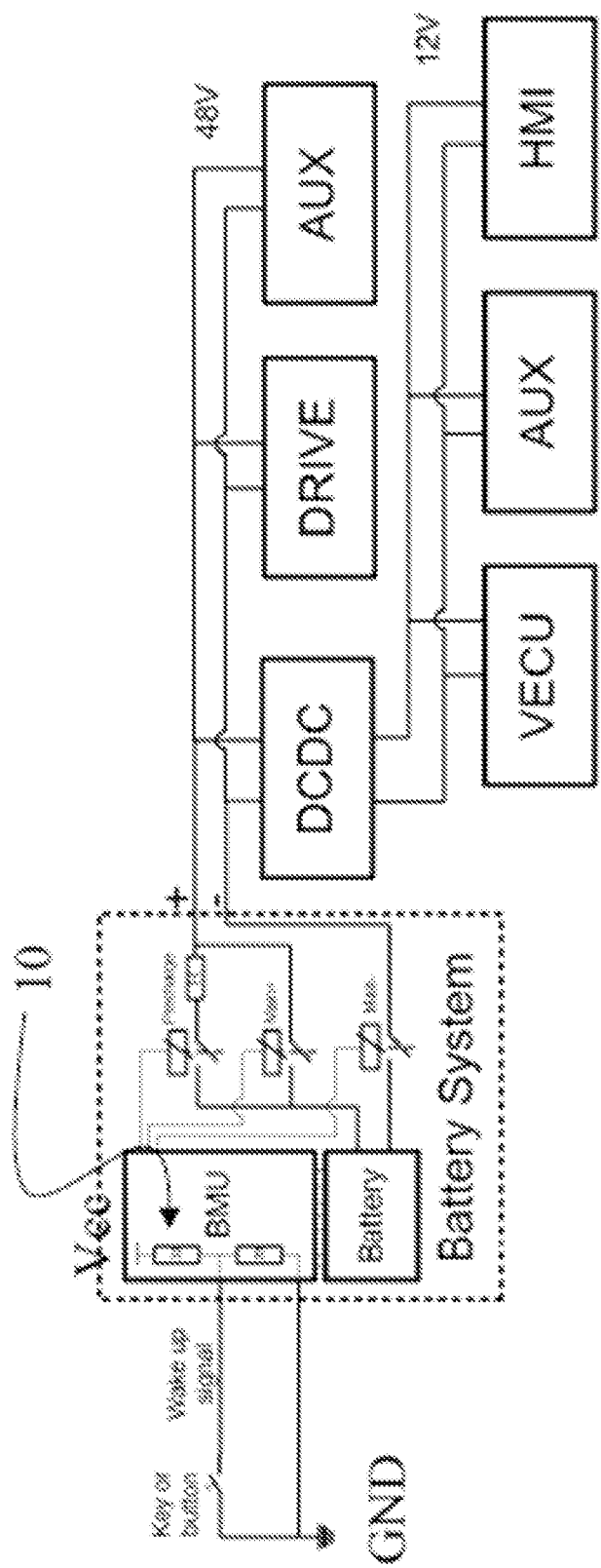
FIG. 2 is a scheme representing a dual voltage electrical architecture of the vehicle of FIG. 1, according to a first example of implementation.

According to a first example shown on FIG. 2, the electronic switch controlled by the vehicle start device is arranged so as to connect (in a closed configuration) the input terminal of the BMU to the ground GND. The input terminal is also connected to a positive electric potential Vcc through a pull-up resistor 10. As a result, the BMU input terminal is by default connected to a positive electric potential Vcc. When an operator operates the vehicle start device, the associated switch is closed, thereby connecting the BMU input terminal to the ground GND. The voltage at BMU input terminal therefore drops to 0V. This change of voltage is detected by the processing circuitry of the BMU, which enters into a wake-up procedure/mode.

Figure 3:
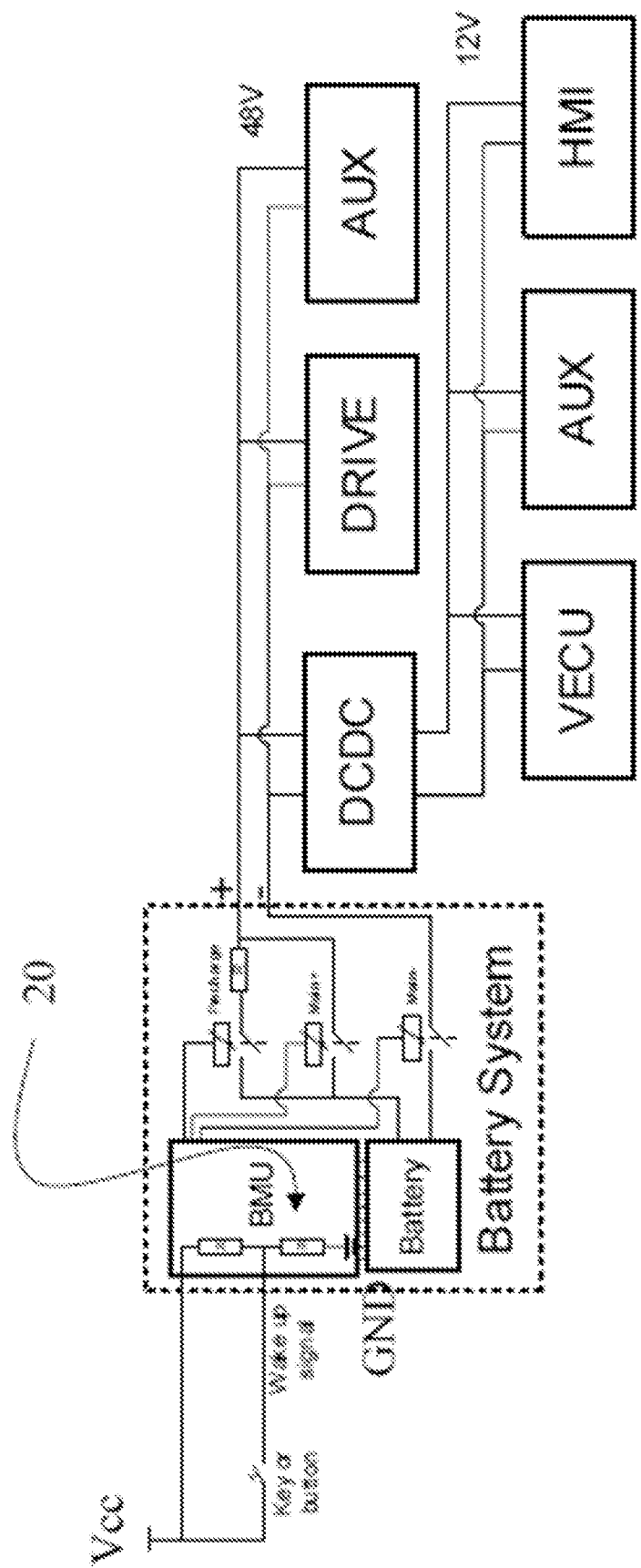
FIG. 3 is a scheme representing a dual voltage electrical architecture of the vehicle of FIG. 1, according to a second example of implementation.

According to a second example shown on FIG. 3, the electronic switch controlled by the vehicle start device is arranged so as to connect the input terminal of the BMU to a positive electric potential Vcc. The input terminal is also connected to the ground GND through a pull-down resistor 20. As a result, the BMU input terminal is by default connected to the ground GND. When an operator operates the vehicle start device, the associated switch is closed, thereby connecting the BMU input terminal to the positive electric potential Vcc. The voltage at BMU input terminal therefore scales up to the voltage of the positive electric potential Vcc. This change of voltage is detected by the processing circuitry of the BMU, which enters into a wake-up procedure/mode.

In the example of FIG. 3, the positive electric potential Vcc is generated by drawing a line from the BMU, in parallel to that comprising the switch controlled by the vehicle start device.

As described above, the wake-up procedure consists of having a limited output current delivered to the DC/DC which, in turn, converts high-voltage delivered by the battery into low-voltage, in order to supply the low-voltage network and turn on the VECU. As a result, the DCDC cannot draw more current than what the battery can deliver without dropping/collapsing the input voltage.

Once the VECU/main vehicle electronic board is awake, the first contactor is closed and afterwards/then the pre-charge contactor is opened. It may be beneficial to respect that order/sequence.

Example 1: A dual voltage electrical architecture for a vehicle, said architecture comprising a low-voltage network, a high-voltage network and a DC/DC converter for transferring power from the high-voltage network to the low-voltage network, the electrical architecture further comprising a high-voltage lithium-ion battery, a first and second contactors connected respectively to a positive and a negative terminals of the lithium-ion battery, a pre-charge circuit consisting of a pre-charge contactor and a pre-charge resistor connected in series, wherein the pre-charge contactor and the pre-charge resistor are connected in parallel with the first contactor, a Battery Management Unit (BMU) for controlling the opening and closing of the contactors and a vehicle start device. The DC/DC converter comprises a first input terminal connected to the first contactor and to the pre-charge contactor and a second input terminal connected to the second contactor. The only power source of the electrical architecture is the lithium-ion battery delivering power to the high-voltage network. The battery management unit comprises an input terminal connected to the vehicle start device so that when the vehicle start device is operated, the electrical architecture enters into a battery wake-up mode, in which the first contactor is open;
the second contactor and the pre-charge contactor are closed; and
the DC/DC converter generates power at low-voltage in order to wake up a main vehicle electronic board.

Example 2: The electrical architecture of claim 1, wherein the vehicle start device controls a switch that connects the input terminal of the battery management unit to the ground (GND) or to a positive electric potential (Vcc).

Example 3: The electrical architecture of Example 2, wherein the battery management unit includes a pull-down resistor between the input terminal and the ground and/or a pull-up resistor between the input terminal and the positive electric potential.

Example 4: The electrical architecture of Example 2 or 3, wherein the positive electric potential is generated by the lithium-ion battery, thereby supplying the battery management unit in permanence.

Example 5: The electrical architecture of any Example 1 to 4, wherein once the main vehicle electronic board is awake, the first contactor is closed and then, the pre-charge contactor is opened.

Example 6: The electrical architecture according to any Example 1 to 5, wherein the battery management unit includes processing circuitry to detect a change of voltage at the input terminal, thereby representing the operation of the vehicle start device.

Example 7: The electrical architecture according to any Example 1 to 6, wherein the DC/DC converter is a step-down converter that automatically steps down voltage whenever a voltage is applied between the two input terminals of the DC/DC converter.

Example 8: The electrical architecture according to any Example 1 to 7, wherein the DC/DC converter includes at least two semiconductors, such as a diode and a transistor and at least one energy storage element, such as a capacitor, an inductor or the two in combination.

Example 9: The low-voltage network is a 12V or 24V network and the high-voltage network is a 48V network.

Example 10: A vehicle comprising the electrical architecture according to any one of Examples 1-9.

Example 11: The vehicle is a construction equipment.

Example 12: The vehicle is a Battery Electric Vehicle or a Hybrid Electric Vehicle.

Example 13: A method for starting a vehicle according to Example 9, the method comprising steps consisting of:
a) operating the vehicle start device;
b) closing the second contactor and the pre-charge contactor, in order to have the DC/DC converter generating power at low-voltage and waking up the main vehicle electronic board;
c) once the main vehicle electronic board is awake, closing the first contactor and then, opening the pre-charge contactor.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A dual voltage electrical architecture for a vehicle, said architecture comprising a low-voltage network, a high-voltage network and a DC/DC converter for transferring power from the high-voltage network to the low-voltage network, the electrical architecture further comprising:
a high-voltage lithium-ion battery,
a first and second contactors connected respectively to a positive and a negative terminals of the lithium-ion battery, a pre-charge circuit consisting of a pre-charge contactor and a pre-charge resistor connected in series, wherein the pre-charge contactor and the pre-charge resistor are connected in parallel with the first contactor, a battery management unit (BMU) for controlling the opening and closing of the contactors, a vehicle start device, wherein the DC/DC converter comprises a first input terminal connected to the first contactor and to the pre-charge contactor and a second input terminal connected to the second contactor, wherein the only power source of the electrical architecture is the lithium-ion battery delivering power to the high-voltage network wherein the battery management unit comprises an input terminal connected to the vehicle start device so that when the vehicle start device is operated, the electrical architecture enters into a battery wake-up mode, in which:

the first contactor is open;

the second contactor and the pre-charge contactor are closed and the DC/DC converter generates power at low-voltage in order to wake up a main vehicle electronic board.

2. The electrical architecture of claim 1, wherein the vehicle start device controls a switch that connects the input terminal of the battery management unit to the ground or to a positive electric potential.

3. The electrical architecture of claim 2, wherein the battery management unit includes a pull-down resistor between the input terminal and the ground and/or a pull-up resistor between the input terminal and the positive electric potential.

4. The electrical architecture of claim 2, wherein the positive electric potential is generated by the lithium-ion battery, thereby supplying the battery management unit in permanence.

5. The electrical architecture of claim 1, wherein once the main vehicle electronic board is awake, the first contactor is closed and then, the pre-charge contactor is opened.

6. The electrical architecture according to claim 1, wherein the battery management unit includes processing circuitry to detect a change of voltage at the input terminal, thereby representing the operation of the vehicle start device.

7. The electrical architecture according to claim 1, wherein the DC/DC converter is a step-down converter that automatically steps down voltage whenever a voltage is applied between the two input terminals of the DC/DC converter.

8. The electrical architecture according to claim 1, wherein the DC/DC converter includes at least two semi-conductors, such as a diode and a transistor and at least one energy storage element, such as a capacitor, an inductor or the two in combination.

9. The electrical architecture according to claim 1, wherein the low-voltage network is a 12V or 24V network and the high-voltage network is a 48V network.

10. A vehicle comprising the electrical architecture according to claim 1.

11. The vehicle according to claim 1, wherein the vehicle is a construction equipment.

12. The vehicle according to claim 10, wherein the vehicle is a Battery Electric Vehicle or a Hybrid Electric Vehicle.

13. A method for starting a vehicle according to claim 1, the method comprising:

operating the vehicle start device;

closing the second contactor and the pre-charge contactor, in order to have the DC/DC converter generating power at low-voltage and waking up the main vehicle electronic board; and once the main vehicle electronic board is awake, closing the first contactor and then, opening the pre-charge contactor.

* * * * *